E. OTTER.
TICKET HOLDER.
APPLICATION FILED APR. 5, 1912.
1,043,052.
Patented Oct. 29, 1912.
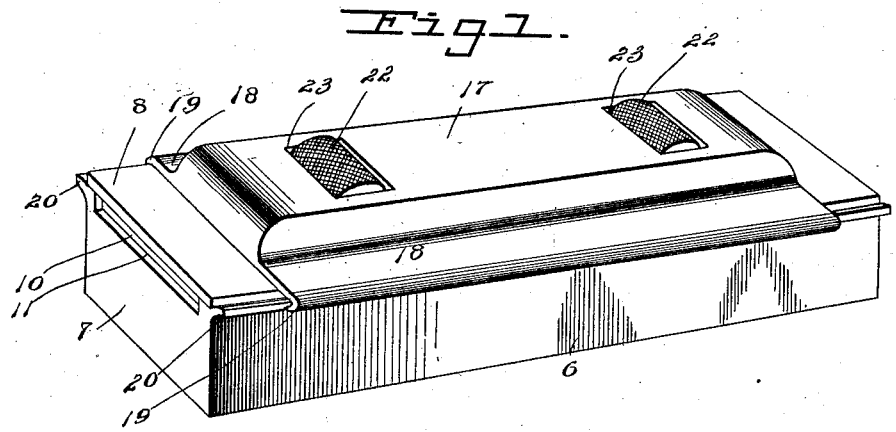
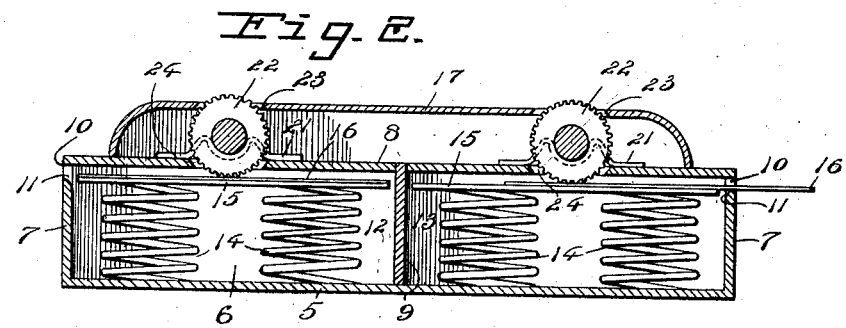
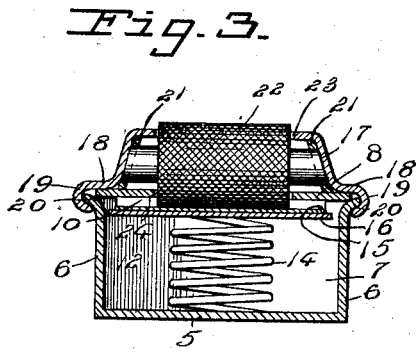
Inventor
Einar Otter.
Witnesses
By Victor J. Evans
Attorney

UNITED STATES PATENT OFFICE.

EINAR OTTER, OF WINNIPEG, MANITOBA, CANADA.

TICKET-HOLDER.

1,043,052.  Specification of Letters Patent.  Patented Oct. 29, 1912.

Application filed April 5, 1912. Serial No. 688,713.

*To all whom it may concern:*

Be it known that I, EINAR OTTER, a subject of the King of Great Britain, residing at the city of Winnipeg, in the Province of Manitoba and Dominion of Canada, have invented new and useful Improvements in Ticket-Holders, of which the following is a specification.

The general object of this invention is the provision of a ticket holder which is adapted to have retained therein tickets of different denominations, and which is provided with novel means for causing said tickets to be ejected from the holder when desired.

In carrying out the objects of the invention generally stated above, it will be understood, of course, that the essential features thereof are susceptible to changes in details and structural arrangements, one preferred and practical embodiment being shown in the accompanying drawings, wherein:—

Figure 1 is a perspective view of the ticket holder constructed in accordance with the invention. Fig. 2 is a vertical longitudinal sectional view thereof. Fig. 3 is a transverse sectional view thereof.

Referring more particularly to the accompanying drawing, it will be seen that the invention comprises a casing consisting of a bottom 5, side and end walls 6 and 7 respectively and a top 8. The partition 9 is mounted in said casing medially the end walls thereof. The end walls 7 are provided at their tops with transverse openings 10, said end walls being rounded contiguous to said openings as indicated at 11 in order to facilitate the ejectment from the casing and prevent the same from jamming in the said openings. The partition 9 divides the casing into two compartments 12 and 13, each compartment having mounted therein a pair of coil springs 14 which are adapted to have secured thereto at one of their ends a ticket holding plate 15 upon which is adapted to rest a ticket 16 which is ejected from the casing in a manner presently described.

Carried by the top 8 of the casing is a hood 17 which is provided upon its longitudinal edges with laterally extending flanges 18, the extremities of which are adapted to be bent as indicated at 19 and engage the flared edges 20 of the side wall 6 and thus securely retain said hood in engagement with the casing. Mounted in the hood 17 by means of suitable bearings 21 arranged upon the top 8 of the casing are a pair of transversely extending corrugated rollers 22 which project through and beyond openings 23 formed in said hood and openings 24 formed in the top 8. It will thus be seen that by reason of the spring pressed plates 15, tickets resting upon said plates will be forced into engagement with the rollers 22 and upon rotations of said rollers, said tickets will be forced through the openings 10.

From the foregoing description it will be obvious that the invention contemplates providing a ticket holder which is simple in construction thus reducing the cost of manufacture of the same to a minimum, and which is durable and effective in operation.

Having thus described the invention, what is claimed is:—

A device of the class described comprising a casing having an opening in each end wall thereof, a partition in said casing for dividing the same into compartments, a hood carried by said casing and spaced therefrom, a corrugated roller mounted in said hood above each of said compartments, said rollers being adapted to project beyond the hood and into said casing, and a spring pressed ticket holding plate mounted in each of said compartments and adapted for normal engagement with said rollers, whereby a ticket may be ejected from each of the compartments through the opening in the end wall adjacent thereto.

In testimony whereof I affix my signature in presence of two witnesses.

EINAR OTTER.

Witnesses:
RICHARD H. KIRKWOOD,
LORNE M. BUCKNAM.

Copies of this patent may be obtained for five cents each, by addressing the "Commissioner of Patents, Washington, D. C."